O. R. MAYER & J. W. SCHOETTLE.
LOOSE LEAF BINDER.
APPLICATION FILED JAN. 13, 1910.

973,528.

Patented Oct. 25, 1910.

Witnesses
O. B. Baenziger
E. M. Brown

Inventors
O. R. Mayer and
J. W. Schoettle
By Edward N. Pagelsen, Attorney

UNITED STATES PATENT OFFICE.

OSWALD R. MAYER AND JULIUS W. SCHOETTLE, OF ANN ARBOR, MICHIGAN, ASSIGNORS TO MAYER, SCHOETTLE & SCHAIRER COMPANY, OF ANN ARBOR, MICHIGAN, A CORPORATION OF MICHIGAN.

LOOSE-LEAF BINDER.

973,528.  Specification of Letters Patent.  Patented Oct. 25, 1910.

Application filed January 13, 1910. Serial No. 537,797.

*To all whom it may concern:*

Be it known that we, OSWALD R. MAYER and JULIUS W. SCHOETTLE, citizens of the United States, and residents of Ann Arbor, in the county of Washtenaw and State of Michigan, have invented a new and useful Loose-Leaf Binder, of which the following is a specification.

This invention relates to means for securing together sheets or leaves of thin materials, such as paper, cloth or metals, and the object of this invention is to provide a cheap, simple and effective binder with jaws which will be securely held in either open or closed positions.

Figure 1:
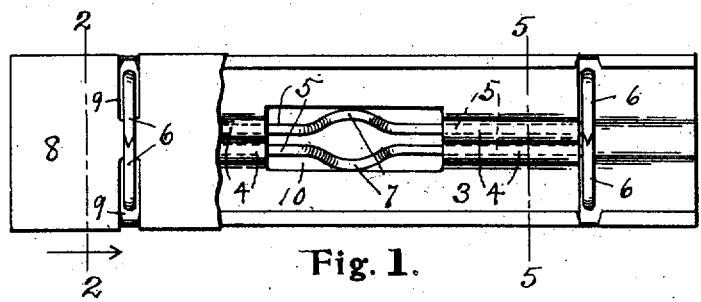
Figure 2:
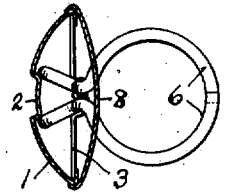
Figure 3:
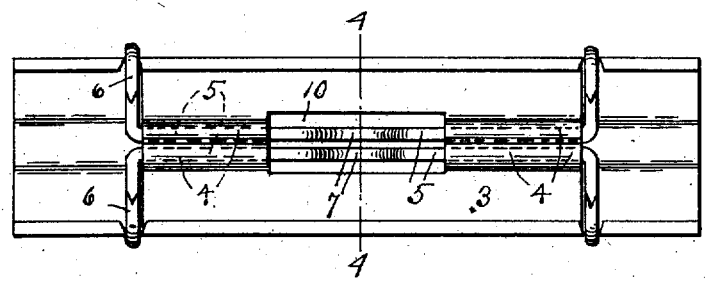
Figure 4:
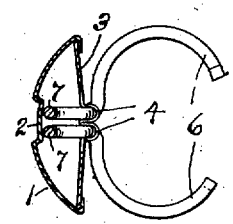
Figure 5:
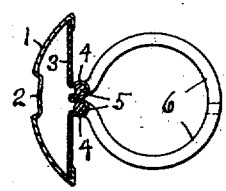
Figure 6:
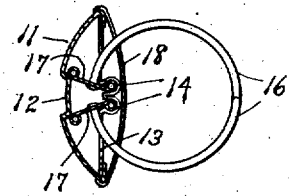
Figure 7:
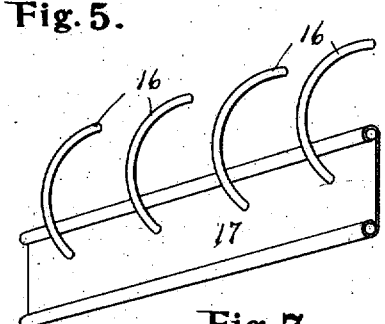
Figure 8:
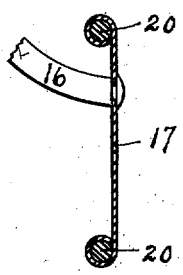

In the accompanying drawing, Figure 1 is a plan of the binder with jaws in closed position, part of the cover-plate being broken away. Fig. 2 is a cross section on the line 2—2 of Fig. 1. Fig. 3 is another plan, the jaws being in open position and the cover-plate being omitted. Fig. 4 is a cross section on the line 4—4 of Fig. 3. Fig. 5 is a cross section on the line 5—5 of Fig. 1. Fig. 6 is a cross section similar to Fig. 2 of a modified form of construction. Fig. 7 is a perspective of a set of jaws and a jaw-carrier of this modified form. Fig. 8 is a transverse cross section of a jaw-carrier.

Similar reference characters refer to like parts throughout the several views.

The binder shown in the drawings is formed by a back, a bearing-plate, a cover-plate if desired, and jaw members. The curved back 1 is preferably of resilient sheet metal and is formed with an interior ridge 2, and has its edges turned inwardly. The bearing plate 3 has parallel bearings formed by bending the metal upwardly in the form of ribs 4, in which bearings the jaw-members 5 are revolubly mounted. Jaws 6 are formed at the ends of the jaw-members 5. Intermediate the jaws, the jaw-members have downwardly extending portions 7, which are adapted to engage the ridge 2.

When the jaws are closed, the portions 7 are just over the edges of the ridge 2, whereby the jaws are prevented from opening. Forcibly separating the jaws, as in Fig. 4, causes the portions 7 to ride up on the shoulders of this rib 2, springing it down. As the top of the ridge is in the form of a trough, the resilience of the back will hold the portions 7 together and thus keep the jaws open. The cover-plate 8 is formed with slots 9 to permit the jaws to extend through, while its outer edges may be turned down over the edges of the back. The back, bearing-plate, and cover may be soldered together at their edges if desired.

If more than two jaws on a side are desired, the following modified construction may be employed. The back 11 with its ridge 12, the bearing-plate 13 with its bearings 14 and the cover-plate 18 are practically the same as just described, excepting that the ridges 14 extend the length of the plate 13, and the opening 10 is omitted. The cover-plate and bearing-plate will be formed with the proper number of slots to permit the jaws 16 to pass through. These jaws are secured to two plates 17, stiffened by having their edges bent around the wires 20, and having one edge of each mounted in the bearings in the plate 13 as shown in Fig. 6. The jaws may be secured to the plates 17 in any manner desired. The operation is the same as that first described.

In both forms of the invention, one jaw of each pair may be notched and the other pointed to enter the notch as shown in Figs. 1 and 3.

Having now explained our construction, what we claim as our invention and desire to secure by Letters Patent is:—

1. In a device of the character described, the combination of a curved back having a central inwardly-extending ridge, a bearing plate extending between the edges of the back and having two longitudinal parallel bearings, and a jaw-member mounted in each of said bearings and having a portion projecting down in engagement with the ridge on the back, and also having upwardly projecting jaws adapted to coöperate with similar jaws on the other jaw-carrier.

2. In a device of the character described, the combination of a back having a central inwardly-extending ridge, a bearing-plate extending between the edges of the back and provided with bearings for the jaw members, two jaw members mounted in said bearings and adapted to engage the ridge on the back to hold the jaws in either open or closed position, and a cover-plate extending between the edges of the back.

3. In a device of the character described, the combination of a plate having bearings, jaw-members mounted in said bearings, the jaws thereof projecting above the plate, and a back of resilient sheet-metal having an inwardly-projecting ridge adapted to engage the jaw member to hold the jaws in closed position.

In testimony whereof we have signed this specification in the presence of two subscribing witnesses.

OSWALD R. MAYER.
JULIUS W. SCHOETTLE.

Witnesses:
C. J. WALZ,
RICE A. BEAL.